United States Patent [19]

Schnorrer

[11] 4,336,071

[45] Jun. 22, 1982

[54] KNEADING AND MODELING COMPOUND AND THE USE THEREOF

[75] Inventor: Heinrich Schnorrer, Schwandorf, Fed. Rep. of Germany

[73] Assignee: Firma J. S. Staedtler, Nuremberg, Fed. Rep. of Germany

[21] Appl. No.: 186,479

[22] Filed: Sep. 12, 1980

[30] Foreign Application Priority Data

Sep. 19, 1979 [DE] Fed. Rep. of Germany ....... 2937843

[51] Int. Cl.³ ............................ C08K 3/22; C08L 1/26
[52] U.S. Cl. .................................. 106/170; 106/193 J; 106/272; 106/271; 524/437; 524/297; 524/569
[58] Field of Search ............. 106/170, 193 R, 193 M, 106/197 R, 272, 288 B, 193 J, 271; 260/42, 23 XA, 31.8 G, 42.19

[56] References Cited

U.S. PATENT DOCUMENTS

| | | | |
|---|---|---|---|
| 3,565,656 | 2/1971 | Sartimauro | 106/304 |
| 3,936,403 | 2/1976 | Sakaguchi et al. | 260/23 XA |
| 3,957,723 | 5/1976 | Lawson et al. | 260/45.7 SW |
| 4,246,158 | 1/1981 | Popp et al. | 260/30.6 R |

*Primary Examiner*—Allan Lieberman
*Assistant Examiner*—P. Short
*Attorney, Agent, or Firm*—Scully, Scott, Murphy and Presser

[57] ABSTRACT

A kneading and modeling compound or clay and the use of such compound which is constituted of binding agents, plasticizers and/or solvents, as well as fillers. The fillers include aluminum hydroxide. The compound may also include pigments and other additives.

19 Claims, No Drawings

KNEADING AND MODELING COMPOUND AND THE USE THEREOF

BACKGROUND OF THE INVENTION

1. Field of the Invention

The present invention relates to a kneading and modeling compound which is constituted of binding agents, plasticizers and/or solvents, as well as fillers and, occasionally, pigments and further additives; as well as relating to the utilization of such compounds.

2. Discussion of the Prior Art

Kneading and modeling compounds or clays for the manual production of plastic representations of all types are widely known.

Thus, for example, German Laid-open Patent Application 25 15 757 describes a plastic compound which is deformable by hand and serves for the production of models, motifs and other kinds of plastic representations, wherein the molded components are hardened at elevated temperatures after their completion and can thereby be rendered durable. These compounds or clays essentially consist of binding agents, plasticizers and fillers, wherein there are overwhelmingly employed different types of PVC as the binding agent and kaolin (aluminum silicate) as the filler.

Described in German Published Patent Applications 24 24 451 and 27 10 115 are permanently plasticized kneading compounds which, among others, consist of polyethylene wax or rubber as the binding agents and of organic-synthetic material or again kaolin or other metal oxides as the filler.

German Published Patent Application 27 10 115 relates to a kneading compound which is maintained in a plasticized and remoldable condition for lengthy periods of time, and which employs kaolin as a filler material for the compound.

An article by G. Schönefeld and J. Walter, GAK May 1974, pages 338 to 342, West Germany, describes the utilization of aluminum hydroxide as a flame-retardant filler for PVC plastisole. However, there is no suggestion of the use of aluminum hydroxide as a filler in kneading and modeling compounds or clays.

However, in all of these known kneading and modeling compounds the circumstance is disadvantageous in that, due to the extensive covering and accordingly, as a rule, the color-distorting heretofore commonly employed fillers, such as kaolin and chalk, always significantly dampened the effect of the added pigments or coloring agents, so that all heretofore known kneading and modeling compounds were effectively always relatively dull or muted and could not be produced in clear, bright and pure coloring hues and tones.

In order to be able to at all achieve an effective coloring effect, in the usual kneading and modeling compounds there is, accordingly, required a relatively high pigment component. Moreover, even in colorless, in essence, translucent kneading compounds, is the transluscence significantly influenced by the utilized fillers so that practically no inherently colorless kneading compounds can herewith be produced.

Furthermore, it is not in the least impossible to contemplate that the known kneading and modeling compounds or clays may physiologically differ due to the relatively high degree of impurity of the usually employed fillers, such as kaolin, chalk or pyrogenic, in essence, highly dispersed silicas, since these impurities are barely controllable, particularly in view of the present content of heavy-metal.

SUMMARY OF THE INVENTION

Accordingly, it is an object of the present invention to provide a kneading and modeling compound or clay which evidences a high color intensity and fidelity, whose coloring remains at an optimum even subsequent to firing, drying or other kind of hardening, and whose physiological acceptance is afforded at a high degree of safety.

The foregoing object of the invention is achieved in that the kneading and modeling compound contains aluminum hydroxide as the filler.

Through the utilization of aluminum hydroxide the colors maintain their brightness and effectiveness even subsequent to the eventual burning or other type of hardening so that the hereby produced models or other representations evidence completely bright coloring hues even without additional color-imparting after-treatment.

Inasmuch as aluminum hydroxide can be produced to an extremely pure degree and thus includes heavy-metals and other impurities within only very confined ranges, the herewith produced kneading compound is physiologically significantly more acceptable than the heretofore known kneading and modeling compounds.

In compounds or clays of this type, which are in many cases used by children, this is extremely important since it cannot be prevented that children will take pieces of these materials or the therewith produced objects into their mouths or will even eat them. This becomes even more applicable when, for instance, fruits or other edible objects are copied with the modeling or molding compound.

For kneading and modeling compounds or clay which are intended for the production of objects which through burning or sintering at elevated temperatures, for instance at temperatures between 100° and 250° C., are rendered permanently shaped, the aluminum hydroxide has been found to be additionally still more advantageous since it exerts a flame-retardant and hydrochloric acid-absorbent effect. This effect, above all else, comes into consideration when polyvinyl chloride or similar plastic materials are employed, and the compound is overheated during hardening.

In kneading and modeling compounds which are hardened by being merely air-dried or which are too permanently remain plastic, in each instance there are particularly effective the advantages encountered with respect to the brightness of the colors and the purity of the filler. When it is desired to produce particularly bright colored members, there can then be employed fluorescent pigments as coloring materials so as to produce an additional daylight luminescent effect which will be particularly emphasized with the utilization of the inventive filler.

DETAILED DESCRIPTION OF THE INVENTION

Generally, kneading and modeling compounds according to the present invention can be prepared according to the following formulae:

50 to 70% binding agents,
10 to 40% plasticizers and solvents,
5 to 40% aluminum hydroxide, and
0 to 10% pigments and other additives and fillers. For compounds of the invention which are hardenable at elevated temperatures, the following formula can be used:
50 to 70% PVC,
4 to 10% calcium stearate,
5 10% aluminum hydroxide,
20 30% di-2-ethyl hexylphthalate,
0.5 to 2% octyl fatty acid ester, and
0 to 2% pigment. Compounds of the invention which are hardenable by air drying can be prepared according to the general formula:
0.5 to 2% cellulose ether,
15 to 50% water,
50 to 85% aluminum hydroxide, and
0.1 to 1% preservative medium. Compounds of the invention which retain platicity, can be prepared according to the formula:
10 to 25% ceresin wax,
10 to 40% paraffin oil,
50 to 80% aluminum hydroxide, and
0.1 to 1% pigment.

Reference is now had to the following detailed description of the inventive kneading and modeling compounds or clays based on various exemplary embodiments.

1. Kneading and modeling compounds hardenable at elevated temperature
    62% binding agent (microbead-paste PVC)
    23% plasticizer (di-2-ethyl hexylphthalate)
    8% aluminum hydroxide
    5.6% calcium stearate
    0.2% coloring agents
    1.2% octyl fatty acid ester
2. Air-drying modeling compound
    1% cellulose ether
    32.7% water
    66% aluminum hydroxide
    0.3% preservative medium
3. Permanently plastic modeling compound
    16.9% ceresin wax
    19.5% paraffin oil
    63.4% aluminum hydroxide
    0.2% coloring pigment The admixture pursuant to Example 1 is particularly suited for the utilization as a kneading and modeling compound or clay for the formation of models, model shapes, plastics, reliefs or various plastic objects or representations. The herewith produced objects can be hardened at elevated temperature, as a rule at temperatures of between 50° and 300° C., according to the employed binding agent and the heat sensivity of the remaining substance, and can thus be rendered permanently shaped.

Without any special hardening these compounds evidence a durable plasticity even under extremely lengthy storage periods.

Kneading and modeling compounds according to Example 2 can be preferably used for modeling or molding, coating and forming of plastic objects of all types when value is imparted to that the finished articles should be permanently held in shape through automatic drying out at approximately room temperature (air-drying).

Admixtures from the group pursuant to Example 3 are determined for use as permanently plastic kneading and modeling compounds or clays. The herewith produced objects can be again destroyed even after a lengthy time interval and molded into the shape of new articles.

In the event it is desired and appears to be advantageous for different purposes, the kneading and modeling compound, in addition to the aluminum hydroxide, can also have added thereto as further filler components aluminum oxide or another filler of the heretofore employed types. This can be particularly the case for white or heavily coated kneading and modeling compounds.

It has been found to be of particular advantage when the inventively proposed aluminum hydroxide evidences a grain size of less than 5 $\mu$m for 95% of the grains.

What is claimed is:

1. In a kneading and modeling compound, including binding agents, plasticizers, solvents, fillers, pigments and other additives; the improvement comprising in that said filler includes at least about 5% aluminum hydroxide.

2. A compound as claimed in claim 1, comprising
    50 to 70% binding agents,
    10 to 40% plasticizers and solvents,
    5 to 40% aluminum hydroxide, and
    0 to 10% pigments and other additives and fillers.

3. A compound as claimed in claim 1 or 2, said binding agent comprising microbead-paste PVC.

4. A compound as claimed in claim 1 or 2, said binding agent comprising at least about 0.5% cellulose ether.

5. A compound as claimed in claim 1 or 2, said binding agent comprising at least about 10% ceresin wax.

6. A compound as claimed in claim 1, comprising
    50 to 70% PVC,
    4 to 10% calcium stearate,
    5 to 10% aluminum hydroxide,
    20 to 30% di-2-ethyl hexylphthalate,
    0.5 to 2% octyl fatty acid ester, and
    0 to 2% pigment.

7. A compound as claimed in claim 1, comprising
    0.5 to 2% cellulose ether,
    15 to 50% water,
    50 to 85% aluminum hydroxide, and
    0.1 to 1% preservative medium.

8. A compound as claimed in claim 1, comprising
    10 to 25% ceresin wax,
    10 to 40% paraffin oil,
    50 to 80% aluminum hydroxide, and
    0.1 to 1% pigment.

9. A compound as cliamed in claim 1, at least 95% of said filler having a grain size of less than 5 $\mu$m.

10. The use of a compound for kneading and modeling comprising a high-molecular binding agent selected from the group consisting of polyvinyl chloride, cellulose ether and ceresin wax; plasticizers and solvents and other additives; and a filler containing at least about 5% aluminum hydroxide.

11. The use of a compound as claimed in claim 10, comprising
    50% to 70% high-molecular binding agent,
    10% to 40% plasticizer and solvent,
    5% to 40% aluminum hydroxide, and
    0% to 10% pigment, other additives and fillers.

12. The use of a compound as claimed in claim 10, comprising
    50 to 70% microbead-paste PVC,
    4 to 10% calcium stearate,
    5 to 10% aluminum hydroxide,
    20 to 30% di-2-ethyl hexylphthalate,
    0.5 to 2% octyl fatty acid ester, and
    0 to 2% pigment.

13. The use of a compound as claimed in claim 10, comprising 0.5 to 2% cellulose ether, 15 to 50% water, 50 to 85% aluminum hydroxide, and 0.1 to 1% preservation medium.

14. The use of a compound as claimed in claim 10, comprising 10 to 25% ceresin wax, 10 to 40% paraffin oil, 50 to 80% aluminum hydroxide, and 0.1 to 1% pigment.

15. The use of a compound as claimed in claim 10 for the production of models, model molds, plastics, reliefs and various plastic objects and representations.

16. The use of a compound as claimed in claim 15 wherein said compound is hardened at an elevated temperature.

17. The use of a compound as claimed in claim 15, wherein said compound is hardened through air-drying at approximately room temperature.

18. The use of a compound as claimed in claim 15, wherein said compound is maintained permanently plastic and constantly remoldable.

19. The use of a compound as claimed in claim 10, at least 95% of the filler having a grain size of less than 5 $\mu$m.

* * * * *